INVENTOR
JEAN FIRMIN JAMMET

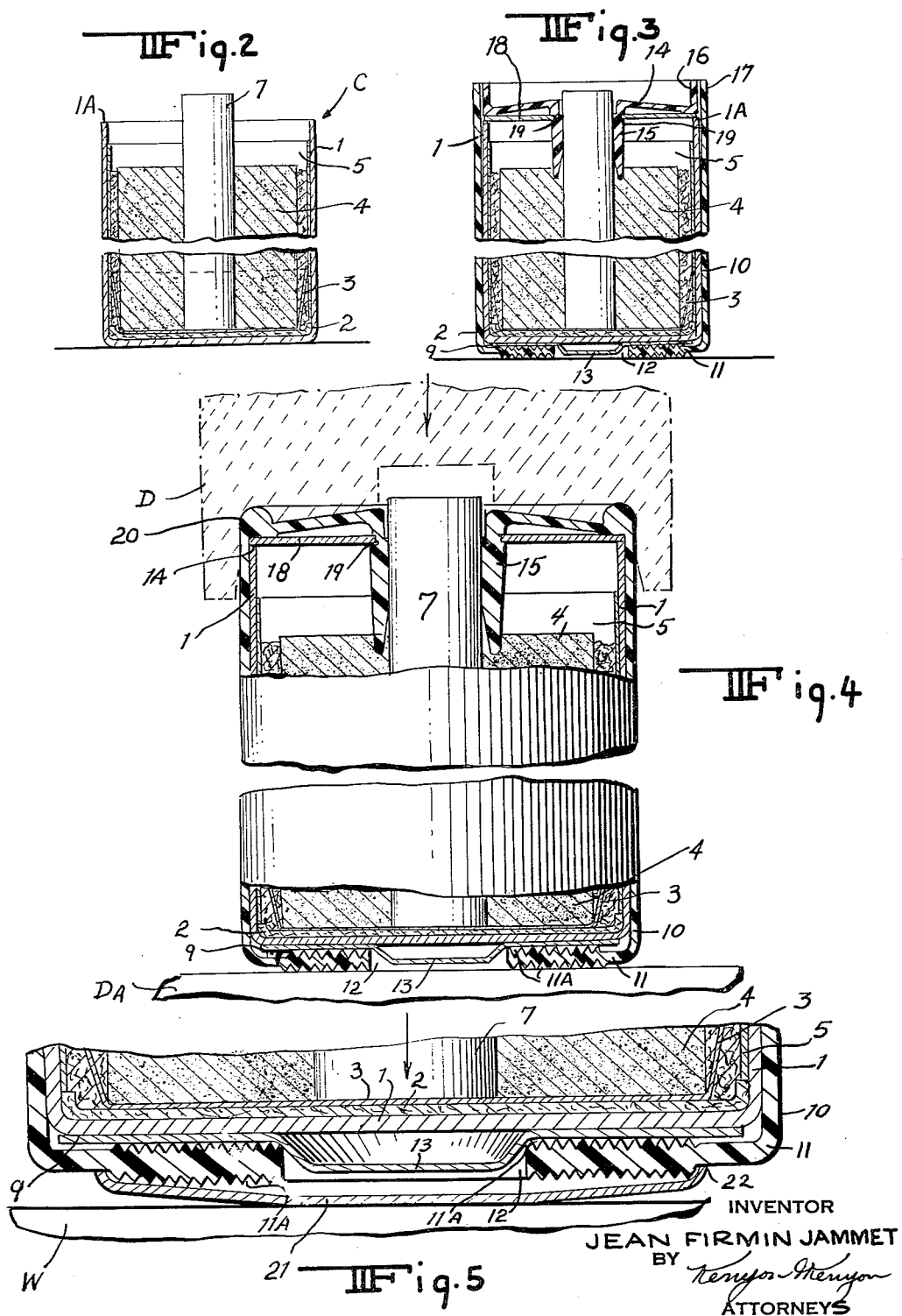

United States Patent Office 3,051,769
Patented Aug. 28, 1962

3,051,769
LEAKPROOF PRIMARY OR SECONDARY CELL AND PROCESS FOR MANUFACTURING THE SAME
Jean Firmin Jammet, Poitiers, France, assignor to Societe des Accumulateurs Fixes et de Traction (Societe Anonyme), Romainville, France, a company of France
Filed July 13, 1960, Ser. No. 42,624
Claims priority, application France July 17, 1959
16 Claims. (Cl. 136—133)

This invention relates to leakproof electrochemical cells, each cell being contained in a plastic casing.

Many arrangements have already been proposed in order to realize and maintain the tightness of such type of cells for a long time whatever the outer atmospheric or environmental conditions, or the accidental impacts resulting from handling or vibrations, may be. Notwithstanding the care with which known cells are made, it has been found in the long run that the electrolyte has leaked slightly, creeping along the outer surface of such cells to the outer face of the cell bottom, a condition which eventually causes short circuiting between the cells of a battery.

One object of this invention is to obviate the latter drawback by simple, cheap and effective means.

Other objects and features of the invention are to provide a leakproof primary or secondary cell preferably, although not necessarily, of the cylindrical type, in which the outer cup-shaped electrode is contained in a plastic casing characterized in that the casing presents a centrally perforated bottom provided with serrations or corrugations preferably in the form of concentric grooves, the said serrated or grooved bottom being tightly pressed in sealing relationship against the cup bottom between two metal discs which are welded or otherwise permanently joined together through the perforation in the casing bottom.

Still other objects and features of the invention are a process for manufacturing such improved leakproof cells, for example, manganese dioxide cells having a zinc cup as a negative electrode and a central carbon rod, characterized in that the cell, provided with all its electrochemical components, is placed in a plastic casing that is substantially deeper than the zinc cup and having a perforated bottom which had been previously provided with the inner metal disc. The cell is then closed at the top by a washer advantageously made of the same material as the casing and provided with a central downward flange tightly surrounding the upper part of the carbon rod, the tightness being the effect of an annular crosspiece of metal such as zinc inserted between the said flange and the casing. Then the peripheral edge of the casing and the annular turned up edge of the plastic washer are united by fusion under pressure thus forming a rim or bead. Then an outer metal disc or plate is positioned to be welded or otherwise permanently joined under pressure to the inner metal disc or plate in the areas of contact in the aperture at the bottom of the casing, and lastly the carbon rod is capped as with a brass contact cap.

It is well understood that the invention may be applied to any kind of primary cell, such as a zinc-mercury oxide cell, and also to the construction of some types of secondary cells such as those where the electrolyte, though gellified, may creep out of the storage cell casing. The construction which is hereafter described, however, without limitation relates to a leak-proof cell of the Leclanché type, this description being, however, given by way of example only.

Other objects and features of the invention will become apparent from the following description and the accompanying drawings, wherein:

FIGURES 2, 3 and 4 are partially sectionalized, partly diagrammatic views illustrating successive stages in the manufacture of such a cell; and FIGURE 5 is an enlarged fragmentary partially sectionalized view of the bottom part of the said cell during its construction.

Figure 1:
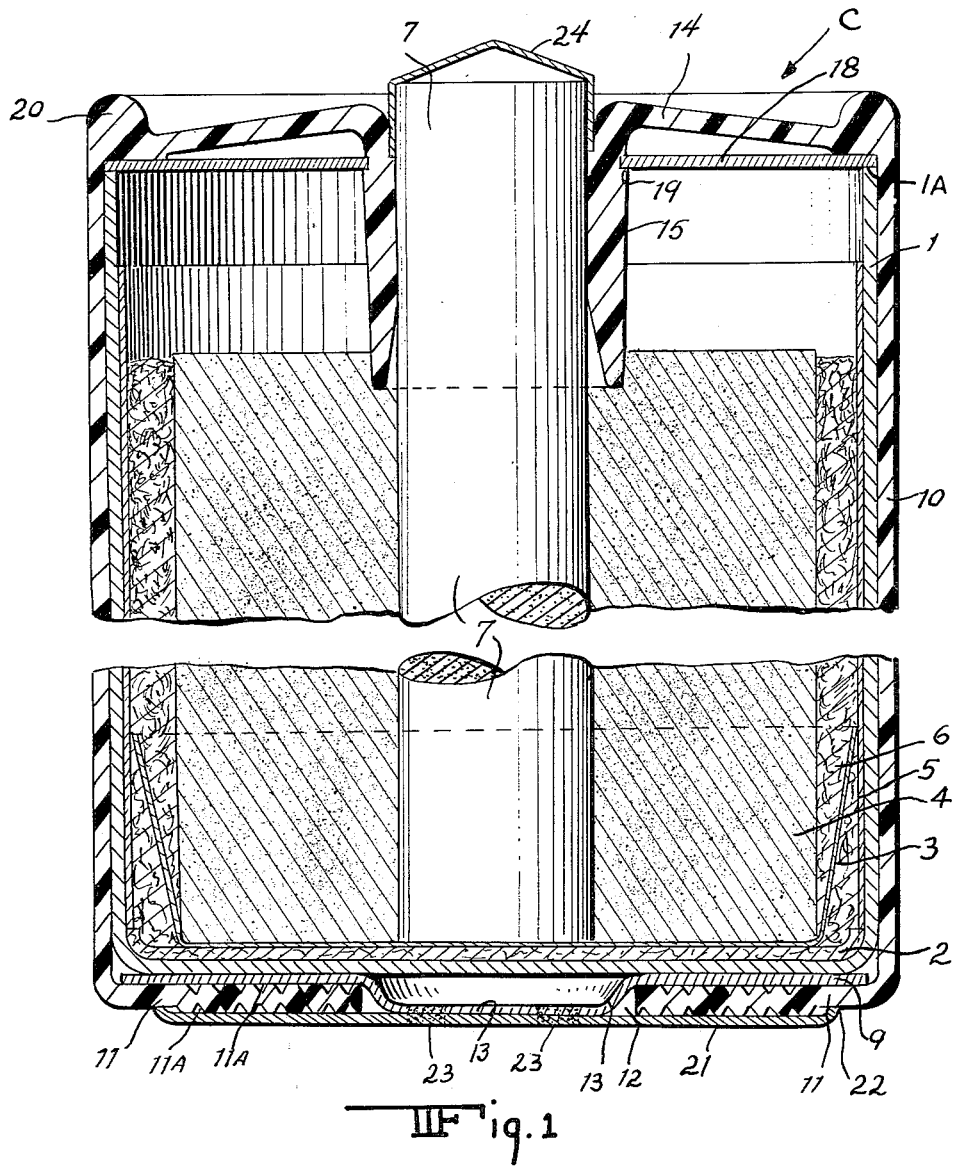
FIGURE 1 is a partially sectionalized view of a cell of the Leclanché type made leakproof according to the invention.

The said Leclanché cell C essentially comprises a zinc cup 1 constituting the negative electrode, in which are placed the other components of the cell, namely (see FIGURE 1):

A bottom insulating disc 2 which may be made, for example, of paraffined cardboard.

A shallow cup 3 made, for example, of kraft paper for centering and protecting the bottom of a depolarizing mix 4.

An electrolytic paper liner 5 which as seen in FIG. 1 substantially entirely covers the inner cylindrical surface of the zinc cup 1.

An electrolytic paste 6 which may be made of cold-gellifying material.

The depolarizing mix 4 is provided with its conventional central carbon rod 7.

The said cell components of cell C thus assembled having previously been provided with a metal plate or disc 9 applied against the bottom of the zinc cup 1, said disc or plate 9 being preferably of tinned sheet iron, for example, is placed in a plastic casing 10 which comprises a bottom portion 11 with a perforation or aperture 12. This bottom portion 11 of the casing preferably is thicker than the cylindrical wall of casing 10. It is serrated, having annular concentric grooves 11A in both its surfaces. The disc 9 is outwardly stamped or embossed in its central part 13 and this boss 13 extends into the perforation 12. In the alternative, the disc or plate 9 may be directly inserted into the casing 10 prior to insertion of the zinc cup 1 into the latter.

The plastic casing 10 may be advantageously made of polyethylene which has excellent insulating properties, which lends itself to use in forming a liquid-tight joint, as will be described and which is permeable to the gas evolved in the cell, and more particularly to hydrogen. Other synthetic plastic materials having similar properties may be used.

A cover member 14 is brought to the upper part of the cell, said cover being advantageously made of the same plastic material as the casing 10, and as seen in FIGURE 3 initially, having a substantially Z-shaped ½ section, one branch of the Z forming an annular downward flange 15 which embraces the carbon rod 7, the other outer flange branch 16 being substantially concentric with and parallel with the upper wall rim part 17 of the casing 10. A ring like plate member 18 made of zinc or any other metal unaltered by the cell's electrolyte or else protected by a coating (not shown) unalterable in the cell's electrolyte is positioned to lie between the downward flange 15 which may be provided for that purpose with a small groove 19, and the inner surface 17 of the casing, resting on the upper rim 1A of zinc cup 1. The object of the said zinc rim 18 is to provide pressure on the flange 15 to cause it to bear tightly against the rod 7 in order to obtain an electrolyte-tight joint between the said flange 15 and said rod 7. The upper edge of the rim flange 16 of the cover and the upper edge of the portion 17 of the casing are aligned and are then welded as by fusing while subject to axial and lateral pressure between die parts D and DA and until a small bead or rim 20 is formed in the place of rim edges of portions 16 of the cover 14 and 17 of the casing 10.

Another disc 21 (FIGURE 5) made of tinned sheet iron, for example, is then applied to the bottom part of the casing 10, said disc being slightly bowed in the shape of a cup with a rim 22 which engages the surface of the grooved bottom 11 of the casing 10. Then with applied axial pressure sufficient to bring the aligned surfaces of the two discs 11 and 13 into contact, they are welded together as by a suitable welder W (e.g., a spot welder or the like) in their center areas of contact in the aperture 12 as at 23, while the grooved bottom 11 is strongly compressed to constitute a liquid-tight joint. This joint is very effective because the electrolyte finds a repeated resistance to its creeping along the bottom because of the serrations and grooves 11A while providing a series of small expansion chambers defined by the grooves 11A in the serrated bottom 11. FIGURE 5 shows the position of both discs or plates 11 and 21 before the compressing and welding operations. The rim 22 also, because of the compression of disc 21 and its permanent joint at 23 with disc 13, tightly engages the bottom face of casing 10 providing a further seal.

It is evident that the order of the operations for obtaining light joints respectively at the upper and bottom parts of the cell, may be reversed.

The carbon rod is thereafter capped with a contact cap 24, which may be made of brass or other suitable metal.

The description which has been given is not limited to the example which has been chosen. The invention may advantageously be applied to any suitable type of primary or secondary cells or batteries.

Although a specific embodiment of the invention has been described and shown, variations in structural detail and process steps within the scope of the appended claims are possible and are contemplated. There is no intention therefore of limitation to the exact structure and process herein set forth.

What is claimed is:

1. A leakproof cell comprising a cup-shaped outer electrode, a plastic casing surrounding said cup-shaped outer electrode, said casing having a perforated bottom, provided with a serrated portion about the perforation, the wall thickness of said serrated portion being thicker than other portions of said bottom, a pair of metal plates positioned on opposite sides of said bottom and joined together in the perforation, said metal plates having parts extending in substantial parallelism with said serrated portion of said casing compressed between said parts of said metal plates.

2. The cell of claim 1 wherein said plastic casing is of polyethylene.

3. The cell of claim 1 wherein said serrated portion comprises grooves on both faces of said perforated bottom and wherein the wall thickness of the serrated portion of said bottom is also greater than the wall thickness of the sides of said casing.

4. The cell of claim 1 wherein one of said metal plates has a boss projecting into said perforation and wherein the other of said plates has a substantially dish-like configuration in section with its outer rim maintained compressed against a face of said bottom of said casing, the joint between said plates being between said boss of said one of said metal plates and the portion of the other of said plates in contact with said boss, said joint being a weld.

5. A leakproof cell comprising a substantially cup-shaped outer electrode, a plastic casing surrounding said outer electrode, said casing having a bottom provided with a perforation and a serrated portion about the perforation, said serrated portion being thicker than other portions of said bottom and the side walls of said casing, a pair of metal plates underlying the bottom of said cup-shaped outer electrode and positioned on opposite sides of said bottom of said casing, one of said plates having a portion projecting into said perforation and said plates being joined together at said perforation, said metal plates having parts extending in substantial parallelism with said serrated portion of said casing bottom lying compressed between said parts of said metal plates.

6. A leakproof cell comprising a substantially cup-shaped cylindrical outer electrode, a plastic casing surrounding said outer electrode and having a bottom portion whose wall thickness is substantially greater than the side wall thickness of said casing, said bottom portion having a centrally located aperture and concentrically disposed portion of greater thickness than other portions of said bottom and having serrations on both its faces about said aperture, a metallic plate positioned between said bottom portion of said casing and the bottom of said electrode, and a second metallic plate underlying said bottom of said casing, said two plates being joined at the aperture with the serrations of said casing maintained compressed thereby between them.

7. A leakproof cell comprising a substantially cup-shaped outer electrode, a second electrode within said first-named electrode extending outwardly thereof, a plastic casing surrounding the side and bottom walls of said outer electrode, said casing having a bottom portion provided with a perforation and a serrated portion about the perforation, said serrated portion being thicker than other portions of said bottom, a metallic plate lying between the bottom wall of the outer electrode and the bottom portion of the casing and overlying said perforation and said serrated portion, a second metallic plate disposed outwardly of the bottom portion of said casing and underlying said aperture and said serrated portion, said two metallic plates being joined together at the aperture with said serrated portion of said casing compressed between them, a plastic cover overlying the upper end of said cup-shaped electrode, said cover having a rim portion permanently joined to the upper rim portion of said plastic casing and an inwardly extending flange portion through which said second electrode projects, a metallic ring-like disc overlying said upper end of said cup-shaped electrode and mounted on said inwardly extending flange portion of said cover, the outer rim of said disc lying embedded in the joint between the rim portion of said cover and the upper rim portion of said casing, and the inner rim of said ring-like disc lying tightly engaged with said inwardly extending flange portion and pressing the latter firmly in sealing relationship with said second electrode.

8. The cell of claim 7 wherein said plastic casing is of polyethylene.

9. The cell of claim 7 wherein said serrated portion comprises grooves on both faces of said bottom portion about said perforation and wherein the wall thickness of said serrated portion of said bottom portion is also greater than the wall thickness of the sides of said casing.

10. The cell of claim 7 wherein one of said metallic plates has a boss projecting into said perforation, and wherein the other of said metallic plates has a substantially dish-like configuration in section with its outer rim maintained compressed in sealing relationship against the face of said casing against which it abuts, the joint between said two plates being between the boss of one and the aligned portion of the other, said joint being a weld.

11. The cell of claim 7 wherein said metallic ring-like disc is of material unaffected by electrolyte within said cell.

12. That improvement in the process of preparing leakproof cells comprising the steps of providing a substantially cup-shaped outer electrode, providing a similarly shaped plastic casing of greater depth than said cup-shaped electrode and into which the latter is adapted to be inserted telescopically, said casing having a bottom portion with a perforation and serrations about said perforation, and including a metallic plate resting on said bottom and overlying said aperture and said serrations, inserting said outer electrode into said casing with its bottom resting on said plate and with its rim then lying below the upper rim of said casing, inserting a rod-like second electrode into said casing with its upper end projecting outwardly of the upper rim of said casing, providing a cover member of the same material as said casing, said cover member having an inner flange portion dimensioned to fit around said rod-like second electrode and an outer flange portion dimensioned to lie substantially parallel with and proximate the upper rim of said casing, mounting a metallic member into engagement with the inner flange of said cover member and the upper rim of said cup-like electrode, then applying axial and lateral pressure to the assembly so compressed and while maintaining said pressure effecting a permanent sealed joint between the rim of said plastic casing and the outer flange of said cover member, then applying a metallic plate externally to the bottom of said casing in axial alignment with its aperture and serrated portion, then applying axial pressure to said assembly and said last-named plate to effect compression of said serrated portion of said casing and also contact between said first-named and said last-named metallic plates at said aperture, and while maintaining such pressure, permanently joining the contacting areas of the latter two metallic plates at said aperture.

13. The improvement in process of claim 12 wherein the cover member is of the same material as that of said plastic casing and wherein the permanent sealed joint between the outer flange of the cover member and the upper rim of said casing is effected by fusion of the plastic material of the two with the formation of a bead.

14. The improvement in the process of claim 12 wherein one of said two metallic plates has substantially dish-like configuration in cross section with its outer rim engaging the adjoining surface of the bottom portion of said casing, and wherein the other of said two metallic plates has a boss-like portion projecting into said aperture, said dish-like metallic plate being flattened by the application of said last-named axial pressure to bring an aligned portion of its surface into contact with the adjoining surface of said boss-like portion, and wherein the permanent joining of said two plate members is effected by welding together thereof at areas of contact between said boss-like portion and said aligned portion.

15. That improvement in the process of preparing leak-proof cells comprising the steps of providing a substantially cup-shaped outer electrode, providing a similarly shaped plastic casing of greater depth than said cup-shaped electrode, said casing having a bottom portion with a perforation and serrations around the perforation, inserting a metallic plate into the casing so that it rests on its bottom and covers said perforation, inserting the cup-shaped electrode into said casing so that its bottom rests on said plate, inserting a rod-like second electrode into said casing with its upper end projecting outwardly of the upper rim of the said outer electrode and of the said casing, providing a plastic cover having substantially Z-shaped half-section, the outer flange of said Z-shaped cover being dimensioned to lie parallel with and proximate the inner surface of said plastic casing at its upper rim, and the inner flange of said Z-shaped cover extending inwardly around and in contact with said rod-like second electrode, mounting a ring-like metallic disc on said inner flange of said cover, said disc being dimensioned so that its outer periphery overlies the rim of said cup-shaped electrode, applying lateral and axial pressure to the assembly so comprised and while maintaining such pressure effecting a fusion weld between the rim of the plastic casing and the outer flange of said cover, then providing a second metallic plate and applying it to the external face of the serrated bottom of said casing, then applying axial pressure to the said assembly and said last-named plate to compress said serrated portion of said casing and effect contact between said metallic plates at said aperture and while maintaining such pressure permanently joining the second metallic plate to the first-named metallic plate at their areas of contact at said aperture.

16. The improvement in the process of claim 15 including a further step of applying a metallic contact cap to rod-like electrode subsequent to the permanent joining of said two metallic plates.

References Cited in the file of this patent

UNITED STATES PATENTS

| | | |
|---|---|---|
| 785,116 | Perry | Mar. 21, 1905 |
| 2,099,599 | Lange | Nov. 16, 1937 |
| 2,143,245 | Lines | Jan. 10, 1939 |
| 2,419,589 | Paul | Apr. 29, 1947 |
| 2,642,471 | Reinhardt et al. | June 16, 1953 |
| 2,672,498 | Temple | Mar. 16, 1954 |
| 2,831,046 | Linton | Apr. 15, 1958 |
| 2,833,848 | Marty | May 6, 1958 |
| 2,901,139 | Isele-Aregger | Aug. 25, 1959 |
| 2,923,866 | Wagner | Feb. 2, 1960 |